US010768631B2

(12) United States Patent
Cheng

(10) Patent No.: US 10,768,631 B2
(45) Date of Patent: Sep. 8, 2020

(54) METHOD AND APPARATUS FOR CONTROLLING A MOBILE ROBOT

(71) Applicants: BEIJING JINGDONG SHANGKE INFORMATION TECHNOLOGY CO., LTD., Beijing (CN); JD.com AMERICAN TECHNOLOGIES CORPORATION, Santa Clara, CA (US)

(72) Inventor: Hui Cheng, Bridgewater, NJ (US)

(73) Assignees: Beijing Jingdong Shangke Information Technology Co., Ltd., Beijing (CN); JD.com American Technologies Corporation, Santa Clara, CA (US)

( * ) Notice: Subject to any disclaimer, the term of this patent is extended or adjusted under 35 U.S.C. 154(b) by 324 days.

(21) Appl. No.: 15/937,087

(22) Filed: Mar. 27, 2018

(65) Prior Publication Data
US 2019/0302790 A1 Oct. 3, 2019

(51) Int. Cl.
*G05D 1/00* (2006.01)
*G05D 1/02* (2020.01)

(52) U.S. Cl.
CPC .......... *G05D 1/0238* (2013.01); *G05D 1/027* (2013.01); *G05D 1/0242* (2013.01); *G05D 1/0246* (2013.01); *G05D 1/0255* (2013.01); *G05D 1/0257* (2013.01); *Y10S 901/01* (2013.01); *Y10S 901/47* (2013.01)

(58) Field of Classification Search
CPC .. G05D 1/0238; G05D 1/0246; G05D 1/0242; G05D 1/0255; G05D 1/027; G05D 1/0257; G05D 1/0088; Y10S 901/47; Y10S 901/01
See application file for complete search history.

(56) References Cited

U.S. PATENT DOCUMENTS

| | | | |
|---|---|---|---|
| 9,569,531 B2 * | 2/2017 | Cheng | G06K 9/00771 |
| 2017/0289771 A1 * | 10/2017 | Magid | H04W 4/33 |
| 2019/0329407 A1 * | 10/2019 | Qi | G06T 7/73 |

* cited by examiner

*Primary Examiner* — Ian Jen
(74) *Attorney, Agent, or Firm* — RatnerPrestia

(57) ABSTRACT

Embodiments of the present disclosure disclose a method and an apparatus for controlling a mobile robot. A specific embodiment of the method comprises: generating pedestrian assessment information based on perception information of the mobile robot, wherein the pedestrian assessment information includes a pedestrian intent type and a pedestrian event type of the nearby pedestrian; then, generating pedestrian behavior information based on the perception information and the pedestrian assessment information, wherein the pedestrian behavior information includes a predicted position information sequence and a predicted behavior type sequence of the nearby pedestrian in a preset future time period; next, generating information for control use based on the perception information, the pedestrian assessment information and the pedestrian behavior information; finally, and controlling the mobile robot based on the information for control use. This embodiment improves a social acceptance of the mobile robot.

17 Claims, 4 Drawing Sheets

METHOD AND APPARATUS FOR CONTROLLING A MOBILE ROBOT

TECHNICAL FIELD

Embodiments of the present disclosure relate to the technical field of robots, specifically to the technical field of mobile robots, and more particularly to a method and apparatus for controlling a mobile robot.

BACKGROUND

A mobile robot refers to a robot having a mobile function. Existing mobile robots usually perform path planning by analyzing and processing various data acquired by sensors so as to avoid colliding with surrounding pedestrians and obstacles.

SUMMARY

Embodiments of the present disclosure provide a method and an apparatus for controlling a mobile robot.

In a first aspect, an embodiment of the present disclosure provides a method for controlling a mobile robot, the method comprising: generating pedestrian assessment information based on perception information of the mobile robot, wherein the perception information includes motion information of the mobile robot, environment information of a surrounding environment, and pedestrian information of a nearby pedestrian, and the pedestrian assessment information includes a pedestrian intent type and a pedestrian event type of the nearby pedestrian; generating pedestrian behavior information based on the perception information and the pedestrian assessment information, wherein the pedestrian behavior information includes a predicted position information sequence and a predicted behavior type sequence of the nearby pedestrian in a preset future time period; generating information for control use based on the perception information, the pedestrian assessment information, and the pedestrian behavior information, wherein the information for control use includes a position information sequence and an action type sequence of the mobile robot within the preset future time period; and controlling the mobile robot based on the information for control use.

In some embodiments, generating information for control use based on the perception information, the pedestrian assessment information, and the pedestrian behavior information comprises: generating an interference type based on the perception information, the pedestrian assessment information, and the pedestrian behavior information, wherein the interference type is configured for characterizing a type of the mobile robot's interference with the nearby pedestrian; and generating the information for control use based on the perception information, the pedestrian assessment information, the pedestrian behavior information, and the interference type.

In some embodiments, generating the information for control use based on the perception information, the pedestrian assessment information, the pedestrian behavior information and the interference type comprises: importing the perception information, the pedestrian assessment information, the pedestrian behavior information and the interference type into a pre-trained social aware behavior planning model to obtain the information for control use, wherein the social aware behavior planning model is configured for characterizing correspondence relationships of the motion information, the environment information, the pedestrian information, the intent type, the event type, the position information sequence, the behavior type sequence, and the interference type with the position information sequence and the action type sequence.

In some embodiments, generating an interference type based on the perception information, the pedestrian assessment information, and the pedestrian behavior information comprises: importing the perception information, the pedestrian assessment information, and the pedestrian behavior information into a pre-trained interference assessment model to obtain the interference type, wherein the interference assessment model is configured for characterizing correspondence relationships of the motion information, the environment information, the pedestrian information, the intent type, the event type, the position information sequence, and the behavior type sequence with an interference type in a preset interference type set.

In some embodiments, generating pedestrian assessment information based on the perception information of the mobile robot comprises: importing the perception information into a pre-trained intent assessment model to obtain the pedestrian intent type of the nearby pedestrian, wherein the intent assessment model is configured for characterizing correspondence relationships of the motion information, the environment information, and the pedestrian information with an intent type in a preset intent type set; and importing the perception information into a pre-trained event detection model to obtain the pedestrian event type of the nearby pedestrian, wherein the event detection model is configured for characterizing correspondence relationships of the motion information, the environment information, and the pedestrian information with an event type in a preset event type set.

In some embodiments, generating pedestrian behavior information based on the perception information and the pedestrian assessment information comprises: generating platform and environment prediction information based on the perception information and the pedestrian assessment information, wherein the platform and environment prediction information includes a motion information sequence of the mobile robot and an environment information sequence of the surrounding environment within the preset future time period; and generating the pedestrian behavior information based on the platform and environment prediction information, the pedestrian information in the perception information, and the pedestrian assessment information.

In some embodiments, generating the platform and environment prediction information based on the perception information and the pedestrian assessment information comprises: importing the perception information and the pedestrian assessment information into a pre-trained platform prediction model to obtain the motion information sequence of the mobile robot within the preset future time period, wherein the platform prediction model is configured for characterizing correspondence relationships of the motion information, the environment information, the pedestrian information, the intent type, and the event type with the motion information sequence; and importing the perception information and the pedestrian assessment information into a pre-trained environment prediction model to obtain the environment information sequence of the surrounding environment within the future preset time period, wherein the environment prediction model is configured for characterizing correspondence relationships of the motion information, the environment information, the pedestrian information, the intent type, and the event type with the environment information sequence.

In some embodiments, generating the pedestrian behavior information based on the platform and environment prediction information, the pedestrian information in the perception information, and the pedestrian assessment information, comprises: importing the platform and environment prediction information, the pedestrian information in the perception information, and the pedestrian assessment information into the pre-trained pedestrian behavior prediction model to obtain the predicted position information sequence and the predicted behavior type sequence of the nearby pedestrian in the preset future time period, wherein the pedestrian behavior prediction model is configured for characterizing correspondence relationships of the motion information sequence, the environment information sequence, the pedestrian information, the intent type, and the event type with the position information sequence and the behavior type sequence.

In some embodiments, the method further comprises: in response to determining that at least one condition in a preset condition group is satisfied, sending wait control information to a monitoring device networked with the mobile robot, wherein the wait control information is configured for instructing the monitoring device to control the mobile robot, and the monitoring device generates a control instruction in response to receiving the wait control information, and sends the generated control instruction to the mobile robot; and in response to receiving the control instruction sent by the monitoring device, controlling the mobile robot to execute the received control instruction.

In some embodiments, the preset condition group includes at least one of: a moving distance of the mobile robot within the preset time period being smaller than a preset distance threshold, failing to generate the pedestrian assessment information based on the perception information, and failing to generate the information for control use based on the perception information, the pedestrian assessment information, and the pedestrian behavior information.

In some embodiments, the mobile robot is a robot for delivering an item.

In some embodiments, the mobile robot stores at least one of: an electronic map, and a common-sense knowledge base.

In some embodiments, the motion information of the mobile robot includes at least one of: location, pose, speed, motion status, and action type of the mobile robot.

In some embodiments, the environment information of the surrounding environment includes at least one of: road information of the surrounding environment, static obstacle information, and dynamic obstacle information.

In some embodiments, the pedestrian information includes at least one of: pedestrian attribute information, and pedestrian behavior type.

In a second aspect, an embodiment of the present disclosure provides an apparatus for controlling a mobile robot, the apparatus comprising: an assessment information generating unit configured to generate pedestrian assessment information based on perception information of the mobile robot, wherein the perception information includes motion information of the mobile robot, environment information of a surrounding environment, and pedestrian information of a nearby pedestrian, and the pedestrian assessment information includes a pedestrian intent type and a pedestrian event type of the nearby pedestrian; a behavior information generating unit configured to generate pedestrian behavior information based on the perception information and the pedestrian assessment information, wherein the pedestrian behavior information includes a predicted position information sequence and a predicted behavior type sequence of the nearby pedestrian in a preset future time period; an information-for-control-use generating unit configured to generate information for control use based on the perception information, the pedestrian assessment information, and the pedestrian behavior information, wherein the information for control use includes a position information sequence and an action type sequence of the mobile robot within the preset future time period; and a first control unit configured to control the mobile robot based on the information for control use.

In some embodiments, the information-for-control-use generating unit comprises: an interference type generating module configured to generate an interference type based on the perception information, the pedestrian assessment information, and the pedestrian behavior information, wherein the interference type is configured for characterizing a type of the mobile robot's interference with the nearby pedestrian; and an information-for-control-use generating module configured to generate the information for control use based on the perception information, the pedestrian assessment information, the pedestrian behavior information, and the interference type.

In some embodiments, the information-for-control-use generating module is further configured to: import the perception information, the pedestrian assessment information, the pedestrian behavior information and the interference type into a pre-trained social aware behavior planning model to obtain the information for control use, wherein the social aware behavior planning model is configured for characterizing correspondence relationships of the motion information, the environment information, the pedestrian information, the intent type, the event type, the position information sequence, the behavior type sequence, and the interference type with the position information sequence and the action type sequence.

In some embodiments, the interference type generating module is further configured to: import the perception information, the pedestrian assessment information, and the pedestrian behavior information into a pre-trained interference assessment model to obtain the interference type, wherein the interference assessment model is configured for characterizing correspondence relationships of the motion information, the environment information, the pedestrian information, the intent type, the event type, the position information sequence, and the behavior type sequence with an interference type in a preset interference type set.

In some embodiments, the assessment information generating unit comprises: an intent type generating module configured to import the perception information into a pre-trained intent assessment model to obtain the pedestrian intent type of the nearby pedestrian, wherein the intent assessment model is configured for characterizing correspondence relationships of the motion information, the environment information, and the pedestrian information with an intent type in a preset intent type set; and an event type generating module configured to import the perception information into a pre-trained event detection model to obtain the pedestrian event type of the nearby pedestrian, wherein the event detection model is configured for characterizing correspondence relationships of the motion information, the environment information, and the pedestrian information with an event type in a preset event type set.

In some embodiments, the behavior information generating unit comprises: a prediction information generating module configured to generate platform and environment prediction information based on the perception information and the pedestrian assessment information, wherein the platform and environment prediction information includes a motion information sequence of the mobile robot and an environment information sequence of the surrounding environment within the preset future time period; and a behavior information generating module configured to generate the pedestrian behavior information based on the platform and environment prediction information, the pedestrian information in the perception information, and the pedestrian assessment information.

In some embodiments, the prediction information generating module is further configured to: import the perception information and the pedestrian assessment information into a pre-trained platform prediction model to obtain the motion information sequence of the mobile robot within the preset future time period, wherein the platform prediction model is configured for characterizing correspondence relationships of the motion information, the environment information, the pedestrian information, the intent type, and the event type with the motion information sequence; and importing the perception information and the pedestrian assessment information into a pre-trained environment prediction model to obtain the environment information sequence of the surrounding environment within the future preset time period, wherein the environment prediction model is configured for characterizing correspondence relationships of the motion information, the environment information, the pedestrian information, the intent type, and the event type with the environment information sequence.

In some embodiments, the behavior information generating module is further configured to: import the platform and environment prediction information, the pedestrian information in the perception information, and the pedestrian assessment information into a pre-trained pedestrian behavior prediction model to obtain the predicted position information sequence and the predicted behavior type sequence of the nearby pedestrian in the preset future time period, wherein the pedestrian behavior prediction model is configured for characterizing correspondence relationships of the motion information sequence, the environment information sequence, the pedestrian information, the intent type, and the event type with the position information sequence and the behavior type sequence.

In some embodiments, the apparatus further comprises: a sending unit configured to: in response to determining that at least one condition in a preset condition group is satisfied, send wait control information to a monitoring device networked with the mobile robot, wherein the wait control information is configured for instructing the monitoring device to control the mobile robot, and the monitoring device generates a control instruction in response to receiving the wait control information, and sends the generated control instruction to the mobile robot; and a second control unit configured to, in response to receiving the control instruction sent by the monitoring device, control the mobile robot to execute the received control instruction.

In some embodiments, the preset condition group includes at least one of: a moving distance of the mobile robot within a preset time period being smaller than a preset distance threshold, failing to generate the pedestrian assessment information based on the perception information, and failing to generate the information for control use based on the perception information, the pedestrian assessment information, and the pedestrian behavior information.

In some embodiments, the mobile robot is a robot for delivering an item.

In some embodiments, the mobile robot stores at least one of: an electronic map, and a common-sense knowledge base.

In some embodiments, the motion information of the mobile robot includes at least one of: location, pose, speed, motion status, and action type of the mobile robot.

In some embodiments, the environment information of the surrounding environment includes at least one of: road information of the surrounding environment, static obstacle information, and dynamic obstacle information.

In some embodiments, the pedestrian information includes at least one of: pedestrian attribute information, and pedestrian behavior type.

In a third aspect, an embodiment of the present disclosure provides an electronic device, the electronic device comprising: one or more processors; and a storage means for storing one or more programs which, when being executed by the one or more processors, cause the one or more processors to implement the method according to any embodiment in the first aspect.

In a fourth aspect, an embodiment of the present disclosure provides a computer-readable medium on which a computer program is stored, wherein the computer program, when being executed by a processor, implements the method described according to any embodiment in the first aspect.

The method and apparatus for controlling a mobile robot provided by the embodiments of the present disclosure improves a social acceptance of the mobile robot by assessing the pedestrian intent type of the nearby pedestrian and the event type of the event where the pedestrian is located during a process of planning the travelling path and actions of the mobile robot through the following steps: firstly, generating pedestrian assessment information based on perception information of the mobile robot, wherein the perception information includes motion information of the mobile robot, environment information of a surrounding environment, and pedestrian information of a nearby pedestrian, and the pedestrian assessment information includes a pedestrian intent type and a pedestrian event type of the nearby pedestrian; then, generating pedestrian behavior information based on the perception information and the pedestrian assessment information, wherein the pedestrian behavior information includes a predicted position information sequence and a predicted behavior type sequence of the nearby pedestrian in a preset future time period; next, generating information for control use based on the perception information, the pedestrian assessment information, and the pedestrian behavior information, wherein the information for control use includes a position information sequence and an action type sequence within the preset future time period of the mobile robot; and finally, controlling the mobile robot based on the information for control use.

BRIEF DESCRIPTION OF THE DRAWINGS

Other features, objectives and advantages of the present disclosure will become more apparent through reading the detailed description of non-limiting embodiments with reference to the accompanying drawings.

DETAILED DESCRIPTION OF THE PREFERRED EMBODIMENTS

Hereinafter, the present disclosure will be described in further detail with reference to the accompanying drawings and the embodiments. It will be appreciated that the preferred embodiments described herein are only for illustration, rather than limiting the present disclosure. In addition, it should also be noted that for the ease of description, the drawings only illustrate those parts related to the present disclosure.

It needs to be noted that without conflicts, the embodiments in the present disclosure and the features in the embodiments may be combined with each other. Hereinafter, the present disclosure will be illustrated in detail with reference to the accompanying drawings in conjunction with the embodiments.

Figure 1:
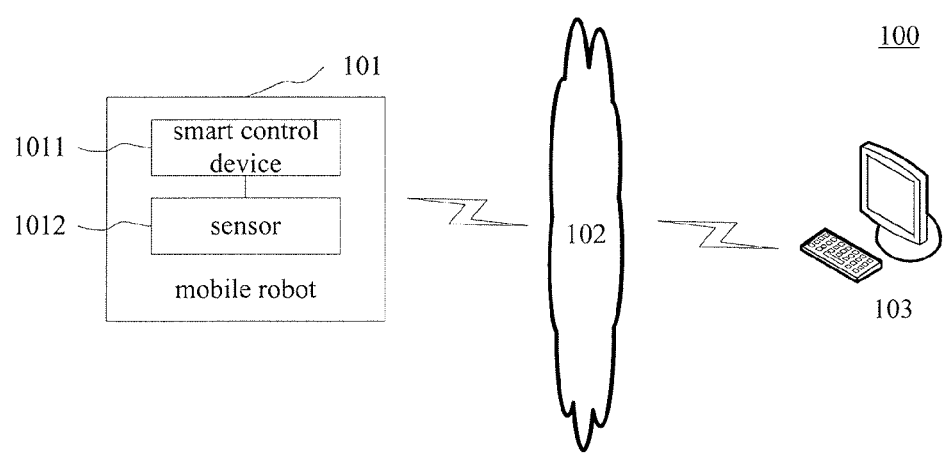
FIG. 1 is an exemplary system architecture diagram in which the present disclosure may be applied.

FIG. 1 illustrates an exemplary system architecture 100 in which a method for controlling a mobile robot or an apparatus for controlling a mobile robot according to the present disclosure may be applied.

As illustrated in FIG. 1, the system architecture 100 may comprise a mobile robot 101, a network 102, and a monitoring device 103. A smart control device 1011 and a sensor 1012 may be provided in the mobile robot 101, wherein the mobile robot 101 may work in a self-controlled mode, i.e., the mobile robot 101 is controlled by itself; the mobile robot 101 may also work in an externally-controlled mode, e.g., the mobile robot 101 may receive a control instruction sent from the monitoring device 103 and execute the control instruction received from the monitoring device 103.

Here, the mobile robot 101 may be a wheel-type mobile robot, a walking mobile robot (one-legged, two-legged and multi-legged), a tracked mobile robot, a crawling robot, a peristaltic robot or a traveling robot, as well as other currently known or future developed mobile robots.

When the mobile robot 101 works in the self-controlled mode, the smart control device (also referred to as the "brain" of the robot) 1011 is responsible for smart control of the mobile robot 101.

When the mobile robot 101 works in the externally-controlled mode, the smart control device 1011 in the mobile robot 101 may provide control-aided information.

The smart control device 1011 may be a separately provided controller, e.g., a programmable logic controller (PLC), a single-chip machine, an industrial control computer, etc.; it may also be a device including other electronic devices that have an input/output port and a function of operation control; it may also be a computer device installed with a mobile robot control application.

The smart control device 1011 may be connected to the monitoring device 103 via the network 102. The network 102 may include various kinds of connection types, e.g., wired or wireless communication link or an optical cable, etc.

The sensor 1012 may acquire surrounding environment data and self-status data of the mobile robot 101 during a traveling process. As an example, the sensor 1012 may include at least one of the following: cameras, stereo-cameras, depth cameras, LIDAR, millimeter-wave radars, ultrasonic sensors, IMU (Inertia Measurement Unit), and speed sensors, etc.

The monitoring device 103 may establish a connection with the smart control device 1011 via the network 102, and the smart control device 1011 may send wait control information to the monitoring device 103; the monitoring device 103 may send a control instruction to the smart control device 1011 after receiving the wait control information, and the smart control device 1011 may execute the received control instruction.

It needs to be noted that the method for controlling a mobile robot as provided according to an embodiment of the present disclosure may be executed by a smart control device 1011; correspondingly, an apparatus for controlling a mobile robot may be provided in the smart control device 1011.

It should be understood that the numbers of mobile robots, sensors, smart control devices, networks and monitoring devices in FIG. 1 are only schematic. Dependent on implementation needs, there may exist any number of mobile robots, sensors, smart control devices, networks, and monitoring devices.

Figure 2:
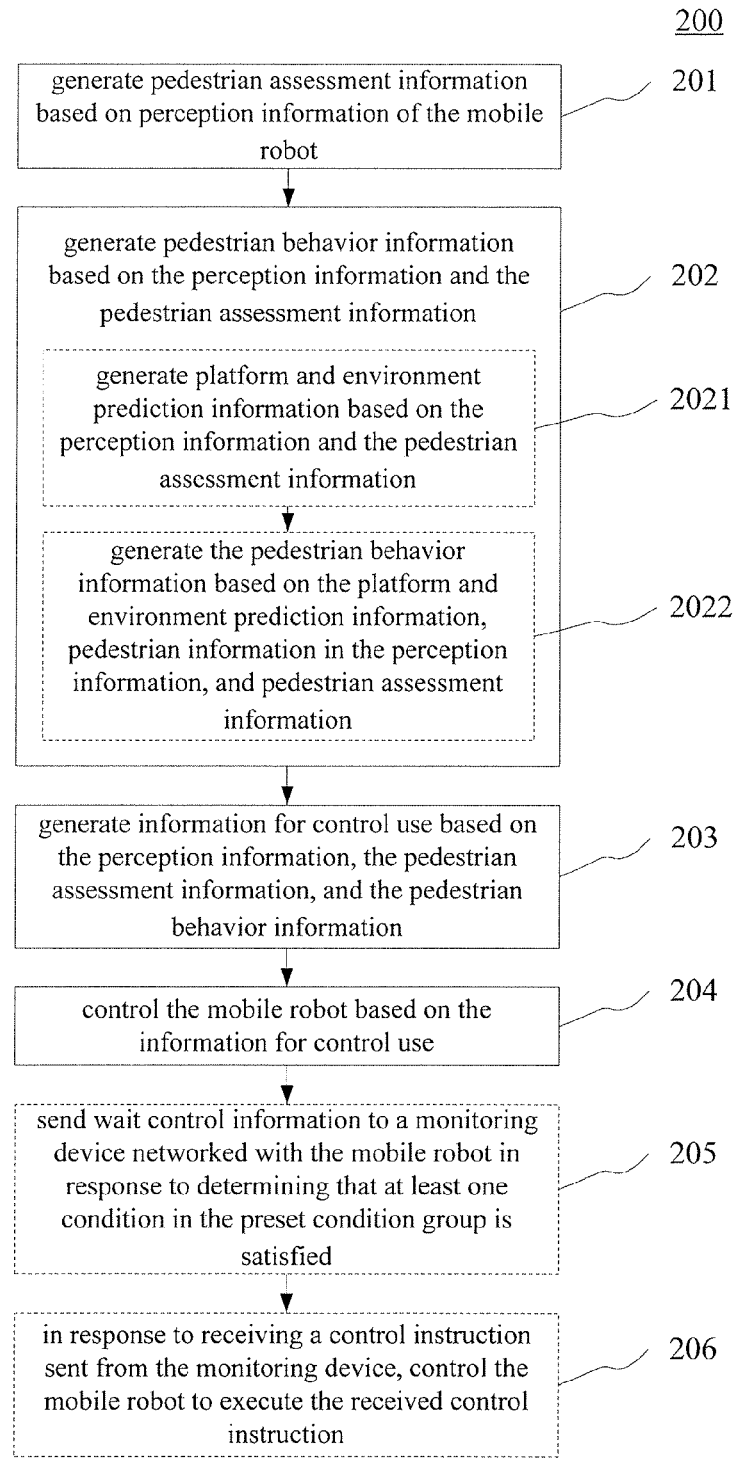
FIG. 2 is a flow diagram of an embodiment of a method for controlling a mobile robot according to the present disclosure.

Continue to refer to FIG. 2, which illustrates a flow chart 200 of an embodiment of a method for controlling a mobile robot according to the present disclosure. The method for controlling a mobile robot comprises steps of:

Step 201: generating pedestrian assessment information based on perception information of the mobile robot.

In this embodiment, an electronic device the smart control device shown in FIG. 1) on which the method for controlling a mobile robot is executed may firstly obtain perception information of the mobile robot, wherein the perception information may include motion information of the mobile robot, environment information of a surrounding environment, and pedestrian information of a nearby pedestrian. Here, the motion information of the mobile robot may refer to various kinds of information describing a current motion status of the mobile robot. The environment information of the surrounding environment refers to various kinds of information describing the current surrounding environment of the mobile robot. The pedestrian information of a nearby pedestrian refers to various kinds of information describing the pedestrian in the current surrounding environment of the mobile robot. It may be understood that an area scope of the current surrounding environment of the mobile robot is determined by performance of a sensor provided in the mobile robot. Namely, an area where the sensor provided in the mobile robot may acquire data is the area scope of the current surrounding environment of the mobile robot.

In some optional implementation manners of this embodiment, the motion information of the mobile robot may include at least one of: location, pose, speed, motion state, and action type of the mobile robot. The mobile robot's location refers to the current location of the mobile robot. The mobile robot's pose may include a course angle, a pitch angle, and a roll angle of the mobile robot as a whole and/or respective components of the mobile robot. The mobile robot's speed may include a travelling speed of the mobile robot as a whole and a speed of respective components of the mobile robot (e.g., a rotation speed of a head-turning action), wherein the speed may include an angular speed and a line speed. The motion state of the mobile robot may include a moving state and a static state. The action type of the mobile robot refers to a type of the action currently executed by the mobile robot. Different mobile robots may execute different actions, and the action types of the mobile robots are also different. For example, the action types of the mobile robots may include, but not limited to: travelling forward at a constant speed, travelling backward at a constant speed, turning left, turning right, stopping, accelerating, decelerating, raising head, lowering head, raising the left arm, lowering the left arm, raising the right arm, lowering the right arm, turning head, playing voice, playing video, rendering images, and rendering text messages, etc.

In some optional implementation manners of this embodiment, the environment information of the surrounding environment may include at least one of the following: road information describing a road in the current surrounding environment of the mobile robot, static obstacle information describing a static obstacle (e.g., a building, a tree, a statue, a traffic sign) in the current surrounding environment of the mobile robot, and dynamic obstacle information describing a dynamic obstacle (e.g., a moving vehicle or animal) in the current surrounding environment of the mobile robot.

In some optional implementation manners of this embodiment, the pedestrian information of the surrounding pedestrian may include at least one of: pedestrian attribute information describing an attribute of a pedestrian in the current surrounding environment of the mobile robot and a pedestrian behavior information describing a behavior of the pedestrian in the current surrounding environment of the mobile robot. For example, the attribute of the pedestrian may include, but not limited to, the pedestrian's gender attribute, age bracket attribute (e.g., children, adolescents, youth, middle age, seniors, etc.), height and other attributes. For another example, the behavior type of the pedestrian may include, but not limited to, sitting, standing, walking, running, turning, stopping, talking, etc.

In practice, the electronic device may firstly acquire various kinds of sensor data from various sensors provided in the mobile robot and then analyze and process the various sensor data acquired to obtain the motion information of the mobile robot, the environment information of the surrounding environment, and the pedestrian information of the nearby pedestrian. For example, the electronic device may acquire speed information of the mobile robot from a speed sensor provided in the mobile robot, may acquire current location information of the mobile robot from a GNSS (Global Navigation Satellite System) device provided in the mobile robot, and may also acquire a pose of the mobile robot from an SINS (Strap-down Inertial Navigation System) provided in the mobile robot. For another example, the electronic device may also firstly acquire various kinds of images shot by various kinds of cameras (ordinary cameras, stereo cameras or depth cameras) provided in the mobile robot and/or laser point cloud data acquired by a laser radar provided in the mobile robot, and then analyze the image data and/or laser point cloud data to obtain the environment information of the surrounding environment of the mobile robot and the pedestrian information of the nearby pedestrian.

Here, because the perception information includes the motion information of the mobile robot, the environment information of the surrounding environment, and the pedestrian information of the nearby pedestrian, the electronic device may generate pedestrian assessment information based on the perception information of the mobile robot using various kinds of implementation manners after obtaining the perception information of the mobile robot. Here, the pedestrian assessment information may include a pedestrian intent type and a pedestrian event type of the pedestrian nearby the mobile robot (i.e., the pedestrian in the current surrounding environment of the mobile robot).

Here, the pedestrian intent type refers to a type of a pedestrian's intent, while the pedestrian's intent refers to a thing the pedestrian plans to or intends to do. For example, the pedestrian's intent may be walking into a restaurant, bypassing a car to talk with another pedestrian, or stopping at a red light, etc. In practice, the pedestrian intent type may be an intent type in a preset intent type set. The preset intent type set may be formed by technicians after summarizing a considerable number of pedestrian intents in real life; or, the preset intent type set may be obtained by performing cluster analysis on a considerable number of pedestrian intents in real life.

Here, the pedestrian event type refers to a type of an event currently experienced by the pedestrian. Here, the event may refer to a single-agent event or a multi-agent event. The agent may be a person or a thing in a real world. For example, the agent may be a person or a vehicle, etc. The single-agent event refers to a thing that is being done by one agent, e.g., one person is sitting, walking or running, and a vehicle is travelling at a constant speed, etc. The multi-agent event refers to interaction among multiple agents over space and/or time. For example, multiple people are attending a conference, a sports meeting, a military training, a speech, a wedding ceremony, a family gathering, queueing, etc. In practice, the pedestrian event type here may be an event type in a preset event type set. The preset event type set may be formed by technicians after summarizing a considerable number of frequently occurring events in real life, or the preset event type set may be formed by performing cluster analysis on a considerable number of frequently occurring events in real life.

It needs to be noted that the nearby pedestrian may refer to at least one nearby pedestrian; likewise, the generated pedestrian assessment information may also refer to pedestrian assessment information of each nearby pedestrian in the at least one nearby pedestrian.

In some optional implementation manners of this embodiment, the step 201 may be implemented as follows:

Looking up, in a first knowledge base, an intent type and an event type which match the perception information, and generating the pedestrian assessment information based on the intent type and the event type as found, wherein the first knowledge base may be a knowledge base that is pre-formulated by technicians based on a considerable amount of motion information, environment information, and pedestrian information, as well as corresponding intent types and event types, storing a plurality of motion information, environment information, and pedestrian information, as well as corresponding intent types and event types.

In some optional implementation manners of this embodiment, the step 201 may also be performed as follows:

Firstly, feature extraction may be performed on the perception information to obtain a feature vector with a first preset number of dimensions.

Secondly, one or more numerical values in the obtained feature vector may be calculated according to a first preset calculation equation to obtain a first calculation result vector.

Then, the first calculation result vector is decoded to obtain the pedestrian intent type and the pedestrian event type.

Finally, the pedestrian assessment information is generated based on the obtained pedestrian intent type and the pedestrian event type.

In some optional implementation manners of this embodiment, the step 201 may be performed as follows:

Firstly, the perception information may be imported into a pre-trained intent assessment model to obtain the pedestrian intent type of the nearby pedestrian, wherein the intent assessment model is configured for characterizing correspondence relationships of the motion information, the environment information, and the pedestrian information with an intent type in a preset intent type set.

It needs to be noted that the intent assessment model may be obtained by supervised training on an existing machine learning model for classification using a machine learning method and a considerable number of training samples, wherein each training sample may include sample perception information and a labelled intent type, while each sample perception information may include motion information, environment information, and pedestrian information, wherein the machine learning model for classification may be Logistic Regression, Linear Regression, SVR (Support Vector Regression), SVM (Support Vector Machine), Naive Bayes, Feed Forward Neural Network, Recurrent Neural Networks, and any other existing or future developed machine learning model for classification.

Secondly, the perception information may be imported into a pre-trained event detection model to obtain a pedestrian event type of the nearby pedestrian, wherein the event detection model is configured for characterizing correspondence relationships of the motion information, the environment information, and the pedestrian information with an event type in a preset event type set.

It needs to be noted that the event detection model may be derived by supervised training on an existing machine learning model for classification using a machine learning method and a considerable number of training samples, wherein each training sample may include sample perception information and a labelled intent type, while each sample perception information may include motion information, environment information, and pedestrian information; wherein the machine learning model for classification may be Logistic Regression, Linear Regression, SVR (Support Vector Regression), SVM (Support Vector Machine), Naive Bayes, Feed Forward Neural Network, Recurrent Neural Networks, and any other existing or future developed machine learning model for classification.

Step 202: generating pedestrian behavior information based on the perception information and the pedestrian assessment information.

In this embodiment, the perception information represents relevant information about the mobile robot, the surrounding environment, and the nearby pedestrian, and the pedestrian intent type generated in step 201 represents a thing the pedestrian plans to do or intends to do, while the pedestrian event type represents an event being currently experienced by the pedestrian. In real life, the pedestrian is currently experiencing an event of the pedestrian event type; normally, the pedestrian will perform a behavior reaching the intent of the pedestrian intent type in consideration of the perception information of the mobile robot. To predict a future behavior of the pedestrian, the electronic device may adopt various kinds of implementation manners to generate pedestrian behavior information based on the perception information and the pedestrian assessment information, wherein the pedestrian behavior information may include a prediction position information sequence and a prediction position type sequence of each nearby pedestrian in the surrounding environment of the mobile robot within a preset future time period.

Here, the preset future time period may refer to a time period between a current time and a time point after a preset time length from the current time. As an example, the preset time length may be 10 seconds.

Here, the predicted location information sequence may include at least one piece of location information arranged in time order. The location information is configured for describing a location. For example, the location information may be two-dimensional coordinates, three-dimensional coordinates or altitude-latitude information. Further, the predicted behavior type sequence may include at least one behavior type arranged in time order. Here, the behavior type refers to a type of behavior of the pedestrian. The pedestrian behavior may refer to a physical action of the pedestrian dominated by his/her thoughts. As an example, the pedestrian behavior may include making an expression or an action (e.g., raising head, turning left, turning right, stopping, standing up, sitting down, walking, running, etc.), uttering a voice, or making a reaction, etc.

In some optional implementations, step 202 may be performed as follows:

looking up, in a second knowledge base, a position information sequence and a behavior type sequence which match the perception information and the pedestrian assessment information, and generating the pedestrian behavior information based on the position information sequence and the behavior type sequence as found, wherein the second knowledge base may be a knowledge base pre-formulated by technicians based on a considerable amount of motion information, environment information, pedestrian information, intent types, and event types, as well as corresponding position information sequences and behavior type sequences, storing a plurality of pieces of motion information, environment information, pedestrian information, intent types, and event types, as well as corresponding position information sequences and behavior type sequences.

In some optional implementation manners of this embodiment, step 202 may also be performed as follows:

Firstly, feature extraction may be performed on the perception information and the pedestrian assessment information to obtain a feature vector with a second preset number of dimensions.

Secondly, one or more numerical values in the obtained feature vector is calculated in accordance with a preset second calculation equation to obtain a second calculation result vector.

Then, the second calculation result vector may be decoded to obtain the location information sequence and the behavior type sequence.

Finally, the pedestrian behavior information is generated based on the obtained location information sequence and the behavior type sequence.

In some optional implementation manners of this embodiment, the step 202 may further comprise a sub-step 2021 and a sub-step 2022 below:

Sub-step 2021: generating platform and environment prediction information based on the perception information and the pedestrian assessment information.

Here, the electronic device may adopt various kinds of implementation manners to generate the platform and environment prediction information based on the perception information and the pedestrian assessment information, wherein the platform and environment prediction information may include the motion information sequence of the mobile robot and the environment information sequence of the environment around within the preset future time period.

Optionally, the sub-step 2021 may be performed as follows:

looking up, in a third knowledge base, a motion information sequence and an environment information sequence which match the perception information and the pedestrian assessment information, and generating the platform and environment prediction information based on the motion information sequence and the environment information sequence as found, wherein the third knowledge base may be a knowledge base pre-formulated by technicians based on a considerable amount of motion information, environment information, pedestrian information, intent types, and event types, as well as corresponding motion information sequences and environment information sequences, storing a plurality of pieces of motion information, environment information, pedestrian information, intent types, and event types, as well as corresponding motion information sequences and environment information sequences.

Optionally, the sub-step 2021 may be performed as follows:

Firstly, feature extraction may be performed on the perception information and the pedestrian assessment information to obtain a feature vector with a third preset number of dimensions.

Secondly, one or more numerical values in the obtained feature vector may be calculated in accordance with a third preset calculation equation to obtain a third calculation result vector.

Then, the third calculation result vector is decoded to obtain a motion information sequence and an environment information sequence.

Finally, the platform and environment prediction information is generated based on the obtained motion information sequence and environment information sequence.

Optionally, the sub-step 2021 may be performed as follows:

Firstly, the perception information and the pedestrian assessment information may be imported into a pre-trained platform prediction model to obtain a motion information sequence of a mobile robot within a preset future time period, wherein the platform prediction model is configured for characterizing correspondence relationships of the motion information, the environment information, the pedestrian information, the intent type, and the event type with the motion information sequence.

It needs to be noted that the platform prediction model may be obtained by supervised training on an existing machine learning model using a machine learning method and a considerable number of training samples, wherein each training sample may include sample perception information, sample pedestrian assessment information and a labelled motion information sequence, while each sample perception information may include motion information, environment information, and pedestrian information, and each sample pedestrian assessment information may include an intent type and an event type; wherein the machine learning model may be Logistic Regression, Linear Regression, SVR (Support Vector Regression), SVM (Support Vector Machine), Naive Bayes, Feed Forward Neural Network, Recurrent Neural Networks, and any other existing or future developed machine learning model.

Then, the perception information and the pedestrian assessment information may be imported into a pre-trained environment prediction model to obtain an environment information sequence of a surrounding environment within a preset future time period, wherein the environment prediction model is configured for characterizing correspondence relationships of the motion information, the environment information, the pedestrian information, the intent type, and the event type with the environment information sequence.

It needs to be noted that the environment prediction model may be obtained by supervised training on an existing machine learning model using a machine learning method and a considerable number of training samples, wherein each training sample may include sample perception information, sample pedestrian assessment information, and a labelled environment information sequence, while each sample perception information may include motion information, environment information, and pedestrian information, and each sample pedestrian assessment information may include an intent type and an event type; wherein the machine learning model may be Logistic Regression, Linear Regression, SVR (Support Vector Regression), SVM (Support Vector Machine), Naive Bayes, Feed Forward Neural Network, Recurrent Neural Networks, and any other existing or future developed machine learning model.

Sub-step 2022: generating the pedestrian behavior information based on the platform and environment prediction information, pedestrian information in the perception information, and pedestrian assessment information.

Here, the electronic device may adopt various kinds of implementation manners to generate the pedestrian behavior information based on the platform and environment prediction information, the pedestrian information in the perception information, and the pedestrian assessment information, wherein the pedestrian behavior information may include a predicted location information sequence and a predicted behavior type sequence of each nearby pedestrian in the surrounding environment of the mobile robot within the preset future time period.

Optionally, the sub-step 2022 is performed as follows:

looking up, in a fourth knowledge base, a location information sequence and a behavior type sequence which match the platform and environment prediction information, the pedestrian information in the perception information, and the pedestrian assessment information, and generating the pedestrian behavior information based on the location information sequence and the behavior type sequence as found, wherein the fourth knowledge base may be a knowledge base that is pre-formulated by technicians based on a considerable amount of motion information sequences, environment information sequences, pedestrian information, intent types, and event types, as well as corresponding location information sequences and behavior type sequences, storing a plurality of motion information sequences, environment information sequences, pedestrian information, intent types, and event types, as well as corresponding location information sequences and behavior type sequences.

Optionally, the sub-step 2022 may also be performed as follows:

Firstly, feature extraction may be performed on the platform and environment prediction information, pedestrian information in the perception information, and pedestrian assessment information to obtain a feature vector with a fourth preset number of dimensions.

Secondly, one or more numerical values in the obtained feature vector are calculated according to a fourth preset calculation equation to obtain a fourth calculation result vector.

Then, the fourth calculation result vector is decoded to obtain the location information sequence and the behavior type sequence.

Finally, the pedestrian behavior information is generated based on the obtained location information sequence and behavior type sequence.

Optionally, the sub-step 2022 may also be performed as follows:

importing the platform and environment prediction information, the pedestrian information in the perception information, and the pedestrian assessment information into a pre-trained pedestrian behavior prediction model to obtain a predicted position information sequence and a predicted behavior type sequence of the nearby pedestrian within the preset future time period, wherein the pedestrian behavior prediction model is configured for characterizing correspondence relationships of the motion information sequence, the environment information sequence, the pedestrian information, the intent type, and the event type with the position information sequence and the behavior type sequence.

It needs to be noted that the pedestrian behavior prediction model may be obtained by supervised training on an existing machine learning model using a machine learning method and a considerable number of training samples, wherein each training sample may include sample platform and environment prediction information, sample pedestrian information, sample pedestrian assessment information, and a labelled pedestrian behavior information, while each sample platform and environment prediction information may include a position information sequence and an environment information sequence, each sample pedestrian assessment information may include an intent type and an event type, and each labelled pedestrian behavior information may include a location information sequence and a behavior type sequence, wherein the machine learning model may be Logistic Regression, Linear Regression, SVR (Support Vector Regression), SVM (Support Vector Machine), Naive Bayes, Feed Forward Neural Network, Recurrent Neural Networks, and any other existing or future developed machine learning model.

Step 203: generating information for control use based on the perception information, the pedestrian assessment information, and the pedestrian behavior information.

To grant a higher social acceptance degree to the mobile robot, i.e., to plan a future travelling path and actions of the mobile robot based on social norms of human beings, the electronic device may adopt various implementation manners to generate the information for control use based on the perception information, the pedestrian assessment information, and the pedestrian behavior information, wherein the information for control use may include a location information sequence and an action type sequence of the mobile robot in the preset future time period.

In some optional implementation manners of this embodiment, step 203 may be performed as follows:

looking up, in a fifth knowledge base, a location information sequence and an action type sequence which match the perception information, the pedestrian assessment information, and the pedestrian behavior information, and generating the information for control use based on the location information sequence and the action type sequence as found, wherein the fifth knowledge base may be a knowledge base that is pre-formulated by technicians based on a considerable amount of motion information, environment information, pedestrian information, intent types, event types, location information sequences, and behavior type sequences as well as corresponding location information sequences and action type sequences, storing a plurality of pieces of motion information, environment information, pedestrian information, intent types, and event types, location information sequences, and behavior type sequences as well as corresponding location information sequences and action type sequences.

In some optional implementation manners of this embodiment, the step 203 may also be performed as follows:

Firstly, feature extraction may be performed on the perception information, pedestrian assessment information, and pedestrian behavior information to obtain a feature vector with a fifth preset number of dimensions.

Secondly, one or more numerical values in the obtained feature vector may be calculated according to a fifth preset calculation equation to obtain a fifth calculation result vector.

Then, the fifth calculation result may be decoded to obtain the location information sequence and the action type sequence.

Finally, the information for control use is generated based on the obtained location information sequence and action type sequence.

In some optional implementation manners of this embodiment, the step 203 may also be performed as follows:

importing the perception information, the pedestrian assessment information, and the pedestrian behavior information into a pre-trained information-for-control-use generation model to obtain a location information sequence and an action type sequence of the mobile robot within the preset future time period, wherein the information-for-control-use generating model is configured for characterizing correspondence relationships of the motion information, the environment information, the pedestrian information, the intent type, the event type, the location information sequence, and the behavior type sequence with the location information sequence and the action type sequence.

It needs to be noted that the information-for-control-use generating model may be obtained by supervised training on an existing machine learning model using a machine learning method and a considerable number of training samples, wherein each training sample may include sample perception information, sample pedestrian assessment information, sample pedestrian behavior information and labeled information for control use, while each sample perception information may include motion information, environment information, and pedestrian information, each sample pedestrian assessment information may include an intent type and an event type, each sample pedestrian behavior information may include a location information sequence and a behavior type sequence, and each labeled information for control use may include a location information sequence and an action type sequence, wherein the machine learning model may be Logistic Regression, Linear Regression, SVR (Support Vector Regression), SVM (Support Vector Machine), Naive Bayes, Feed Forward Neural Network, Recurrent Neural Networks, and any other existing or future developed machine learning model.

Step 204: controlling the mobile robot based on the information for control use.

In this embodiment, the electronic device may generate a corresponding control instruction sequence based on the information for control use as generated in step 203 and send each control instruction in the generated control instruction sequence to a corresponding component in the mobile robot which executes the control instruction such that the mobile robot may be controlled to execute the instruction sequence corresponding to the information for control use.

In some optional implementation manners of this embodiment, the electronic device may execute step 205 and step 206 below after the step 204:

Step 205: sending wait control information to a monitoring device networked with the mobile robot in response to determining that at least one condition in the preset condition group is satisfied.

Here, the monitoring device networked with the mobile robot may be an electronic device having a certain computation capability. The monitoring device is configured for monitoring and controlling the mobile robot. The mobile robot may send wait control information to the monitoring device for seeking help from the monitoring device when at least one condition in the preset condition group is satisfied, wherein the wait control information is configured for instructing the monitoring device to control the mobile robot. In this way, the monitoring device may generate a control instruction in response to receiving the wait control information and send the generated control instruction to the mobile robot.

Optionally, the preset condition group may include at least one of the following:

(1) a moving distance of the mobile robot within the preset time period is smaller than a preset distance threshold.

Namely, if the mobile robot does not move for a long time or has a too small moving distance, it indicates that the mobile robot possibly has a fault; in this case, the wait control information may be sent to the monitoring device to seek for help from the monitoring device.

(2) failing to generate the pedestrian assessment information based on the perception information.

Namely, at this point, the statuses of the surrounding environment and the nearby pedestrian have gone beyond a comprehensive scope of the electronic device, and the electronic device cannot make a correct judgment on the surrounding environment and the nearby pedestrian; in this case, the wait control information may be sent to the monitoring device to seek for help from the monitoring device.

(3) failing to generate the information for control use based on the perception information, the pedestrian assessment information, and the pedestrian behavior information.

Namely, at this point, the electronic device fails to generate pedestrian assessment information, causing that the information for control use fails to be generated based on the perception information, the pedestrian assessment information, and the pedestrian behavior information. Or, although the electronic device generates the pedestrian assessment information, but it fails to generate the pedestrian behavior information base on the perception information and the pedestrian assessment information. Or, although the electronic device generates pedestrian assessment information and generates the pedestrian behavior information based on the perception information and the pedestrian assessment information, the information for control use fails to be generated based on the perception information, the pedestrian assessment information, and the pedestrian behavior information; at this point, the wait control information may be sent to the monitoring device to seek for help from the monitoring device.

Step 206: in response to receiving a control instruction sent from the monitoring device, controlling the mobile robot to execute the received control instruction.

Here, after receiving the control instruction sent from the monitoring device, the electronic device may control the mobile robot to execute the received control instruction.

In some optional implementation manners of this embodiment, the mobile robot may be a robot for delivering an item. For example, to reduce the cost of last-mile delivery, especially in dense urban environment, mobile robots may be deployed to deliver items. In this case, the mobile robots may either travel on roads, sidewalks, campuses, hallways, elevators, offices or residential buildings. In such occasions, they will frequently encounter pedestrians. To reduce their interference with pedestrians and improve the mobile robots' acceptance degree by human beings, a smart control device provided in the mobile robots may control the mobile robots according to the method described in this embodiment, thereby achieving the object that the mobile robots are acceptable to the human beings and fulfillment costs are reduced.

In some optional implementation manners of this embodiment, at least one of the following may be stored in the mobile robot: an electronic map and a common-sense knowledge base. It may be understood that for the mobile robot to perform path planning, an electronic map may be stored in the mobile robot. To improve the mobile robot's social acceptance, a common-sense knowledge base may be stored in the mobile robot. The common-sense knowledge base here stores common-sense knowledge for the mobile robot which is stipulated based on life and social common sense of human beings, such that the mobile robot may plan its own travelling path or actions based on the knowledge in the common-sense knowledge base. As an example, the mobile robot's common-sense knowledge may be: stopping when the traffic signal lamp turns red, and waiting till the traffic signal lamp turns green before crossing the road; when pedestrians walking side by side, no passing between the two pedestrians, but bypassing them; when approaching a pedestrian too close, apologizing to the pedestrian (e.g., playing a voice, image or text to express apology); although the mobile robot's speed can be relatively fast, considering that too fast moving may possibly cause the pedestrians to feel threatened or uncomfortable, controlling its own speed; when multiple people are queueing, no penetrating through the queue, etc.

It should be noted that the first knowledge base, the second knowledge base, the third knowledge base, the fourth knowledge base, the fifth knowledge base and the common-sense knowledge base described in the optional implementation manners of this embodiment may respectively be separate knowledge bases, and the knowledge bases described above also may be different parts of one knowledge base, this application does not make a specific restriction on this.

The method provided by the embodiment of the present disclosure may improve a social acceptance of the mobile robot by assessing the pedestrian intent type of the nearby pedestrian and the event type of the event where the pedestrian is located during a process of planning the travelling path and actions of the mobile robot through the following steps: firstly, generating pedestrian assessment information based on perception information of the mobile robot, wherein the perception information includes motion information of the mobile robot, environment information of a surrounding environment, and pedestrian information of a nearby pedestrian, and the pedestrian assessment information includes a pedestrian intent type and a pedestrian event type of the nearby pedestrian; then, generating pedestrian behavior information based on the perception information and the pedestrian assessment information, wherein the pedestrian behavior information includes a predicted position information sequence and a predicted behavior type sequence of the nearby pedestrian in a preset future time period; next, generating information for control use based on the perception information, the pedestrian assessment information, and the pedestrian behavior information, wherein the information for control use includes a position information sequence and an action type sequence of the mobile robot within the preset future time period; and finally, controlling the mobile robot based on the information for control use.

Figure 3:
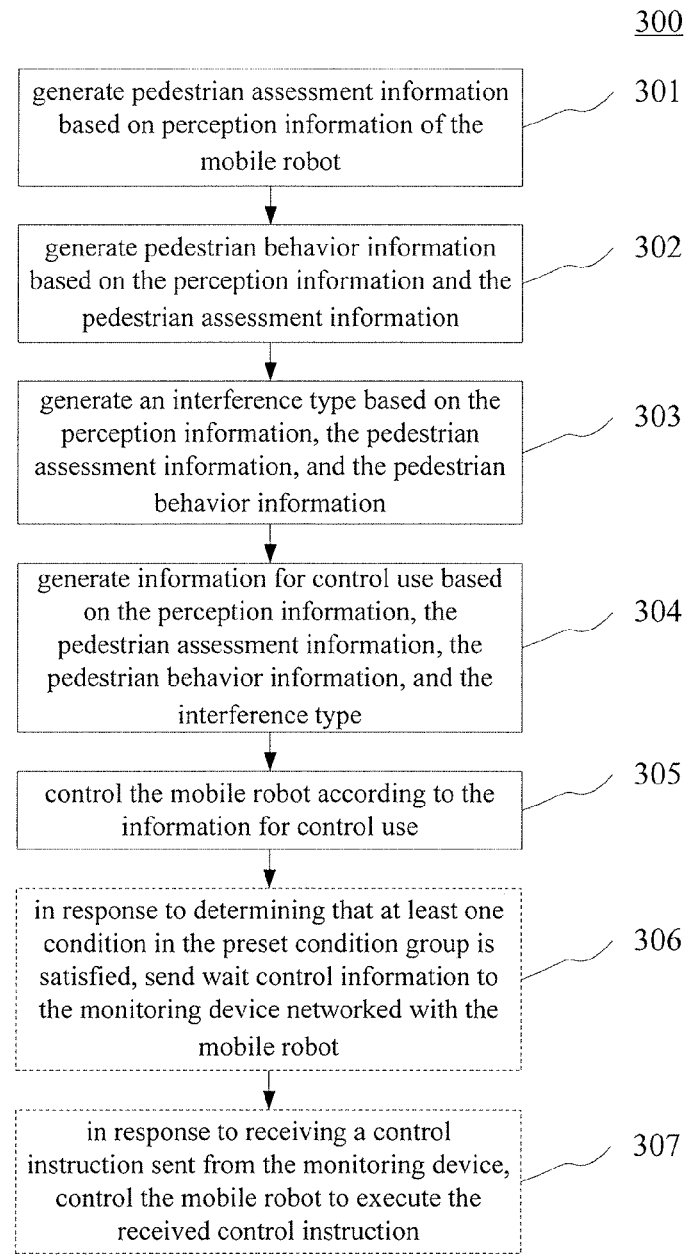
FIG. 3 is a flow diagram of another embodiment of a method for controlling a mobile robot according to the present disclosure.

Further refer to FIG. 3, which is a flow diagram of another embodiment of a method for controlling a mobile robot according to the present disclosure. The flow 300 of the method for controlling a mobile robot comprises steps of:

Step 301: generating pedestrian assessment information based on perception information of the mobile robot.

Step 302: generating pedestrian behavior information based on the perception information and the pedestrian assessment information.

In this embodiment, specific operations of step 301 and step 302 are substantially identical to the step 201 and the step 202 in the embodiment shown in FIG. 2, which will not be detailed here.

Step 303: generating an interference type based on the perception information, the pedestrian assessment information, and the pedestrian behavior information.

In this embodiment, after obtaining the pedestrian assessment information and the pedestrian behavior information, an electronic device (e.g., the smart control device shown in FIG. 1) on which the method for controlling a mobile robot is executed may adopt various implementation manners to generate an interference type based on the perception information, the pedestrian assessment information, and the pedestrian behavior information, wherein the interference type is configured for characterizing a type of the mobile robot's interference with a nearby pedestrian. The mobile robot's interference with the nearby pedestrian refers to an impact and/or inconvenience caused by the location and/or action of the mobile robot to the nearby pedestrian. In practice, the interference type may be any kind of interference type in a preset interference type set. The preset interference type set may be formed by technicians after summarizing a considerable number of interferences possibly caused by mobile robots with pedestrians; or, the preset interference type set may be obtained after performing cluster analysis on a considerable number of interferences possibly caused by mobile robots with pedestrians.

In some optional implementation manners of this embodiment, the step 303 may be performed as follows:

looking up, in a sixth knowledge base, an interference type that matches the perception information, the pedestrian assessment information, and the pedestrian behavior information, and determining the interference type found as the generated interference type, wherein the sixth knowledge base may be a knowledge base that is pre-formulated by technicians based on a considerable amount of motion information, environment information, pedestrian information, intent types, event types, location information sequences, and behavior type sequences, as well as corresponding interference types, storing a plurality of pieces of motion information, environment information, pedestrian information, intent types, event types, location information sequences, and behavior type sequences, as well as corresponding interference types.

In some optional implementation manners of this embodiment, the step 303 may also be performed as follows:

Firstly, feature extraction may be performed on the perception information, the pedestrian assessment information, and the pedestrian behavior information to obtain a feature vector with a sixth preset number of dimensions.

Secondly, one or more numerical values in the obtained feature vector may be calculated according to a sixth preset calculation equation to obtain a sixth calculation result vector.

Then, the sixth calculation result vector is decoded to obtain an interference type.

Finally, the obtained interference type is determined as the generated interference type.

In some optional implementation manners of this embodiment, the step 303 may also be performed as follows:

importing the perception information, the pedestrian assessment information, and the pedestrian behavior information into a pre-trained interference assessment model to obtain an interference type, wherein the interference assessment model is configured for characterizing corresponding relationships of the motion information, the environment information, the pedestrian information, the intent type, the event type, the location information sequence, and the behavior type sequence with the interference types in the preset interference type set.

It needs to be noted that the interference assessment model may be obtained by supervised training on an existing machine learning model for classification using a machine learning method and a considerable number of training samples, wherein each training sample may include sample perception information, sample pedestrian assessment information, sample pedestrian behavior information, and a labelled interference type, while each sample perception information may include motion information, environment information, and pedestrian information; each sample pedestrian assessment information may include the intent type and the event type, and each sample pedestrian behavior information may include a location information sequence and a behavior type sequence, wherein the machine learning model for classification may be Logistic Regression, Linear Regression, SVR (Support Vector Regression), SVM (Support Vector Machine), Naive Bayes, Feed Forward Neural Network, Recurrent Neural Networks, and any other existing or future developed machine learning model for classification.

Step 304: generating information for control use based on the perception information, the pedestrian assessment information, the pedestrian behavior information, and the interference type.

To grant a higher social acceptance degree to the mobile robot, i.e., to plan a future travelling path and actions of the mobile robot based on social norms of human beings, the electronic device may adopt various implementation manners to generate the information for control use based on the perception information, the pedestrian assessment information, the pedestrian behavior information, and the interference type, wherein the information for control use may include a location information sequence and an action type sequence of the mobile robot in the preset future time period.

In some optional implementation manners of this embodiment, the step 304 may be performed as follows:

looking up, in a seventh knowledge base, a location information sequence and an action type sequence which match the perception information, the pedestrian assessment information, the pedestrian behavior information, and the interference type, and generating the information for control use based on the location information sequence and the action type sequence as found, wherein the seventh knowledge base may be a knowledge base that is pre-formulated by technicians based on a considerable amount of motion information, environment information, pedestrian information, intent types, event types, location information sequence, behavior type sequences, and interference types, as well as corresponding location information sequences and action type sequences, storing a plurality of pieces of motion information, environment information, pedestrian information, intent types, event types, location information sequences, behavior type sequences, and interference types, as well as corresponding location information sequences and action type sequences.

In some optional implementation manners of this embodiment, the step 304 may also be performed below:

Firstly, feature extraction may be performed on the perception information, the pedestrian assessment information, the pedestrian behavior information, and the interference type to obtain a feature vector with a seventh preset number of dimensions.

Secondly, one or more numerical values in the obtained feature vector may be calculated according to a seventh preset calculation equation to obtain a seventh calculation result vector.

Then, the seventh calculation result vector may be decoded to obtain a location information sequence and an action type sequence.

Finally, the information for control use is generated based on the obtained location information sequence and the action type sequence.

In some optional implementation manners of this embodiment, the step 304 may also be performed below:

importing the perception information, the pedestrian assessment information, the pedestrian behavior information, and the interference type into a pre-trained social aware behavior planning model to obtain the information for control use, wherein the social aware behavior planning model is configured for characterizing correspondence relationships of the motion information, the environment information, the pedestrian information, the intent types, the event type, the location information sequence, the behavior type sequence, and the interference type with the location information sequence and the action type sequence.

It needs to be noted that the social aware behavior planning model may be obtained by supervised training on an existing machine learning model using a machine learning method and a considerable number of training samples, wherein each training sample may include sample perception information, sample pedestrian assessment information, sample pedestrian behavior information, sample interference type and labelled information for control use, while each sample perception information may include motion information, environment information, and pedestrian information; each sample pedestrian assessment information may include the intent type and the event type, each sample pedestrian behavior information may include a location information sequence and a behavior type sequence, and each labelled information for control use may include a location information sequence and an action type sequence, wherein the machine learning model may be Logistic Regression, Linear Regression, SVR (Support Vector Regression), SVM (Support Vector Machine), Naive Bayes, Feed Forward Neural Network, Recurrent Neural Networks, and any other existing or future developed machine learning model.

Step 305: controlling the mobile robot according to the information for control use.

In this embodiment, the specific operation of the step 305 is substantially identical to that of the step 204 in the embodiment shown in FIG. 2, which will not be detailed here.

In some optional implementation manners of this embodiment, the electronic device may also execute step 306 and step 307 below after the step 305.

Step 306: in response to determining that at least one condition in the preset condition group is satisfied, sending wait control information to the monitoring device networked with the mobile robot.

Step 307: in response to receiving a control instruction sent from the monitoring device, controlling the mobile robot to execute the received control instruction.

Specific operations of the step 306 and the step 307 in this embodiment are substantially identical to those of the step 205 and the step 206 in the embodiment shown in FIG. 2, which will not be detailed here.

It may be seen from FIG. 3 that compared with the embodiment corresponding to FIG. 2, the flow 300 of the method for controlling a mobile robot in the embodiment highlights the step of generating an interference type. In this way, the interference type may be introduced in the solution described in this embodiment to improve the social acceptance degree of the mobile robot to a greater extent.

Figure 4:
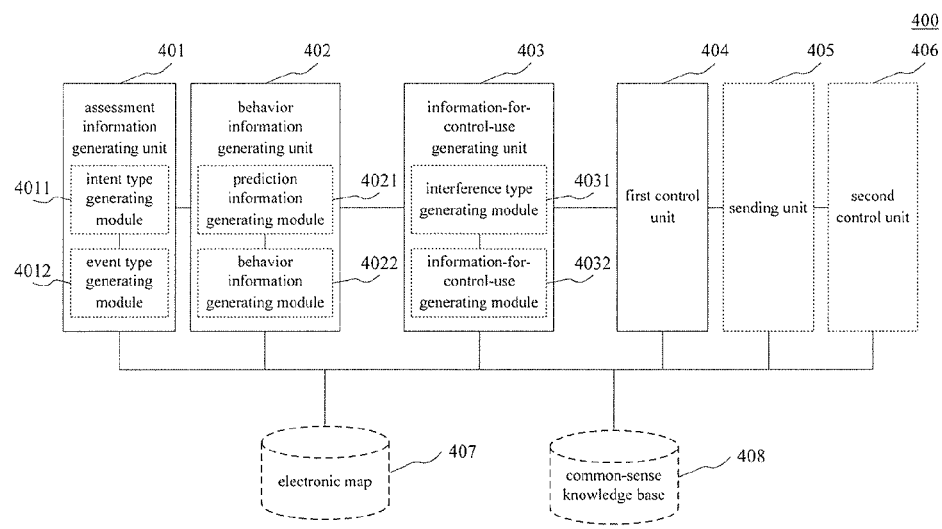
FIG. 4 is a structural schematic diagram of an embodiment of an apparatus for controlling a mobile robot according to the present disclosure.

Further referring to FIG. 4, as an implementation of the methods shown in various figures above, the present disclosure provides an embodiment of an apparatus for controlling a mobile robot. This apparatus embodiment corresponds to the method embodiment shown in FIG. 2. This apparatus specifically may be applied to various electronic devices.

As illustrated in FIG. 4, the apparatus 400 for controlling a mobile robot according to this embodiment comprises: an assessment information generating unit 401, a behavior information generating unit 402, an information-for-control-use generating unit 403, and a first control unit 404, wherein the assessment information generating unit 401 is configured to generate pedestrian assessment information based on perception information of the mobile robot, wherein the perception information includes motion information of the mobile robot, environment information of a surrounding environment, and pedestrian information of a nearby pedestrian, and the pedestrian assessment information includes a pedestrian intent type and a pedestrian event type of the nearby pedestrian; the behavior information generating unit 402 is configured to generate pedestrian behavior information based on the perception information and the pedestrian assessment information, wherein the pedestrian behavior information includes a predicted position information sequence and a predicted behavior type sequence of the nearby pedestrian in a preset future time period; the information-for-control-use generating unit 403 is configured to generate information for control use based on the perception information, the pedestrian assessment information, and the pedestrian behavior information, wherein the information for control use includes a position information sequence and an action type sequence of the mobile robot within the preset future time period; and the first control unit 404 is configured to control the mobile robot based on the information for control use.

In this embodiment, specific processing of the assessment infatuation generating unit 401, the behavior information generating unit 402, the information-for-control-use generating unit 403, and the first control unit 404 of the apparatus 400 for controlling the mobile robot, as well as the technical effects brought thereby, may refer to relevant descriptions of steps 201, 202, 203, and 204 in the embodiment corresponding to FIG. 2, which thus will not be detailed here.

In some optional implementation manners of this embodiment, the information-for-control-use generating unit 403 may comprise: an interference type generating module 4031 configured to generate an interference type based on the perception information, the pedestrian assessment information, and the pedestrian behavior information, wherein the interference type is configured for characterizing a type of the mobile robot's interference with the nearby pedestrian; and an information-for-control-use generating module 4032 configured to generate the information for control use based on the perception information, the pedestrian assessment information, the pedestrian behavior information, and the interference type.

In some optional implementation manners of this embodiment, the information-for-control-use generating module 4032 may be further configured to: import the perception information, the pedestrian assessment information, the pedestrian behavior information and the interference type into a pre-trained social aware behavior planning model to obtain the information for control use, wherein the social aware behavior planning model is configured for characterizing correspondence relationships of the motion information, the environment information, the pedestrian information, the intent type, the event type, the position information sequence, the behavior type sequence, and the interference type with the position information sequence and the action type sequence.

In some optional implementation manners of this embodiment, the interference type generating module 4031 may be further configured to: import the perception information, the pedestrian assessment information, and the pedestrian behavior information into a pre-trained interference assessment model to obtain the interference type, wherein the interference assessment model is configured for characterizing correspondence relationships of the motion information, the environment information, the pedestrian information, the intent type, the event type, the position information sequence, and the behavior type sequence with an interference type in a preset interference type set.

In some optional implementation manners of this embodiment, the assessment information generating unit 401 may comprise: an intent type generating module 4011 configured to import the perception information into a pre-trained intent assessment model to obtain the pedestrian intent type of the nearby pedestrian, wherein the intent assessment model is configured for characterizing correspondence relationships of the motion information, the environment information, and the pedestrian information with an intent type in a preset intent type set; and an event type generating module 4012 configured to import the perception information into a pre-trained event detection model to obtain the pedestrian event type of the nearby pedestrian, wherein the event detection model is configured for characterizing correspondence relationships of the motion information, the environment information, and the pedestrian information with an event type in a preset event type set.

In some optional implementation manners of this embodiment, the behavior information generating unit 402 may comprise: a prediction information generating module 4021 configured to generate platform and environment prediction information based on the perception information and the pedestrian assessment information, wherein the platform and environment prediction information includes a motion information sequence of the mobile robot and an environment information sequence of the surrounding environment within the preset future time period; and a behavior information generating module 4022 configured to generate the pedestrian behavior information based on the platform and environment prediction information, the pedestrian information in the perception information, and the pedestrian assessment information.

In some optional implementation manners of this embodiment, the prediction information generating module 4021 may be further configured to: import the perception information and the pedestrian assessment information into a pre-trained platform prediction model to obtain the motion information sequence of the mobile robot within the preset future time period, wherein the platform prediction model is configured for characterizing correspondence relationships of the motion information, the environment information, the pedestrian information, the intent type, and the event type with the motion information sequence; and importing the perception information and the pedestrian assessment information into a pre-trained environment prediction model to obtain the environment information sequence of the surrounding environment within the future preset time period, wherein the environment prediction model is configured for characterizing correspondence relationships of the motion information, the environment information, the pedestrian information, the intent type, and the event type with the environment information sequence.

In some optional implementation manners of this embodiment, the behavior information generating module 4022 may be further configured to: import the platform and environment prediction information, the pedestrian information in the perception information, and the pedestrian assessment information into a pre-trained pedestrian behavior prediction model to obtain the predicted position information sequence and the predicted behavior type sequence of the nearby pedestrian in the preset future time period, wherein the pedestrian behavior prediction model is configured for characterizing correspondence relationships of the motion information sequence, the environment information sequence, the pedestrian information, the intent type, and the event type with the position information sequence and the behavior type sequence.

In some optional implementation manners of this embodiment, the apparatus 400 may further comprise: a sending unit 405 configured to: in response to determining that at least one condition in a preset condition group is satisfied, send wait control information to a monitoring device networked with the mobile robot, wherein the wait control information is configured for instructing the monitoring device to control the mobile robot, and the monitoring device generates a control instruction in response to receiving the wait control information, and sends the generated control instruction to the mobile robot; and a second control unit 406 configured to, in response to receiving the control instruction sent by the monitoring device, control the mobile robot to execute the received control instruction.

In some optional implementation manners of this embodiment, the preset condition group may include at least one of: a moving distance of the mobile robot within a preset time period being smaller than a preset distance threshold, failing to generate the pedestrian assessment information based on the perception information, and failing to generate the information for control use based on the perception information, the pedestrian assessment information, and the pedestrian behavior information.

In some optional implementation manners of this embodiment, the mobile robot may be a robot for delivering an item.

In some optional implementation manners of this embodiment, the mobile robot may store at least one of: an electronic map 407, and a common-sense knowledge base 408.

In some optional implementation manners of this embodiment, the motion information of the mobile robot may include at least one of: location, pose, speed, motion status, and action type of the mobile robot.

In some optional implementation manners of this embodiment, the environment information of the surrounding environment may include at least one of: road information of the surrounding environment, static obstacle information, and dynamic obstacle information.

In some optional implementation manners of this embodiment, the pedestrian information may include at least one of: pedestrian attribute information, and pedestrian behavior type.

It needs to be noted that implementation details and technical effects of respective units in the apparatus for controlling a mobile robot provided by the embodiments of the present application may refer to the descriptions in other embodiments of the present disclosure, which thus will not be detailed.

Figure 5:
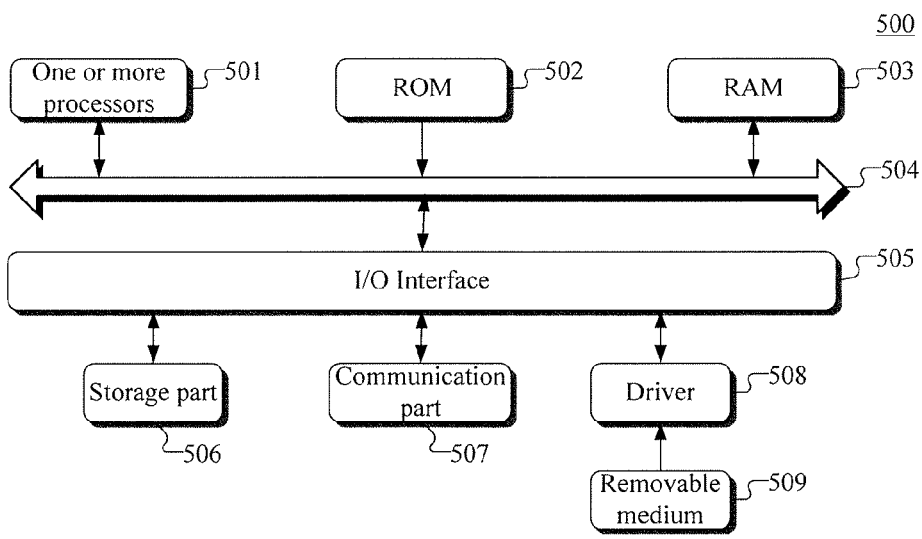
FIG. 5 is a structural schematic diagram of a computer system for an electronic device adapted to implement the embodiments of the present disclosure.

Now, refer to FIG. 5, which shows a structural schematic diagram of a computer system 500 of an electronic device, which is adapted for implementing the embodiments of the present disclosure. The computer system shown in FIG. 5 is only an example, which should not bring any limitation to the functions and use scopes of the embodiments of the present disclosure.

As shown in FIG. 5, the computer system 500 comprises one or more processors 501 which may perform various kinds of appropriate actions and processing based on computer program stored in a read-only memory (ROM) 502 or computer program loaded into the random-access memory (RAM) 503 from a memory part 506. In RAM 503, there may also store various kinds of programs and data needed for operations of the system 500. one or more processors 501, ROM 502, and RAM 503 are connected with each other via a bus 504. The input/output (I/O) interface 505 may also be connected to the bus 504.

The following components are connected to the I/O interface 505, including: a memory part 506 including a hard disk, etc.; and a communication part 507 including a network interface card such as a LAN (Local Area Network) card, a modem, etc. The communication part 507 performs communication processing via a network such as the Internet. A driver 508 is also connected to the I/O interface 505 as needed. A removable medium 509, such as a magnetic disk, an optical disk, a magneto-optical disk, and a semiconductor memory, etc., is mounted on the driver 508 as needed, so as to facilitate the computer program read therefrom to be installed in the memory part 506.

Particularly, according to the embodiments of the present disclosure, the processes described above with reference to the flow diagrams may be implemented as computer software programs. For example, an embodiment of the present disclosure includes a computer program product that has a computer program carried on a computer-readable medium, the computer program containing computer codes for executing the methods shown in the flow diagrams. In such an embodiment, the computer programs may be downloaded and installed from a network through the communication part 507 and/or installed from the removable medium 509. When being executed by the one or more processors 501, the computer programs execute the functions limited in the methods of the present disclosure. It needs to be noted that the computer readable medium as described in the present disclosure may be a computer-readable signal medium or a computer-readable storage medium or any combination thereof. The computer-readable storage medium, for example, may be, but not limited to, an electrical, magnetic, optical, electromagnetic, infrared, or semiconductor system, apparatus or device, or any combination thereof. More specific examples of the computer-readable storage medium may include, but not limited to: an electrical connection having one or more wires, a portable computer magnetic disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any appropriate combination thereof. In the present disclosure, the computer-readable storage medium may be any tangible medium containing or storing a program that may be used by an instruction executing system, apparatus, or device or used in combination therewith. Further, in the present disclosure, the computer-readable signal medium may include a data signal propagated in a baseband or as part of a carrier, in which computer-readable program code are carried. A data signal propagated in such a way may assume a plurality of forms, including, but not limited to, an electromagnetic signal, an optical signal, or any appropriate combination thereof. The computer-readable signal medium may also be any computer-readable medium other than the computer-readable storage medium, which computer-readable medium may send, propagate or transmit the programs used by the instruction executing system, apparatus or device or used in combination therewith. The program code embodied on the computer-readable medium may be transmitted using any appropriate medium, including, but not limited to: wireless, wired, cable, RF, etc., or any appropriate combination thereof.

One or more programming languages or a combination thereof may be used to compile the computer program codes for executing the operations in the present disclosure. The programming languages include object-oriented programming languages (such as Java, Smalltalk, C++), and also include conventional procedural programming languages (such as "C" language or similar programming languages). The program code may be completely executed on a user computer, partially executed on the user computer, executed as an independent software packet, or partially executed on the user computer while partially executed on the remote computer, or completely executed on the remote computer or the server. In a scene associated with a remote computer, the remote computer may be connected to the user computer via any kind of network (including a local area network (LAN) or a wide area network (WAN), or may be connected to the external computer (for example, connected via the Internet through an Internet Service Provider).

The flow diagrams and block diagrams in the drawings illustrate system architectures, functions, and operations possibly implemented by the system, method, and computer program product of various embodiments of the present disclosure. At this point, each block in the flow diagrams or block diagrams may represent a module, a program segment, or part of codes, wherein the module, program segment, or part of codes contain one or more executable instructions for implementing a prescribed logic function. It should also be noted that in some alternative implementations, the functions annotated in the blocks may also occur in a sequence different from what is indicated in the drawings. For example, two successively expressed blocks actually may be executed substantially in parallel, and they may be sometimes executed in a reverse order, dependent on the functions involved. It should also be noted that each block in the block diagrams and/or flow diagrams and a combination of blocks in the block diagrams and/or flow diagrams may be implemented by a specific hardware-based system for executing a prescribed function or operation, or may be implemented by a combination of specific hardware and computer instructions.

The units mentioned in the description of the embodiments of the present disclosure may be implemented in a software manner or in a hardware manner. The described units may be disposed in a processor, for example may be described as: a processor comprising an assessment information generating unit, a behavior information generating unit, an information-for-control-use generating unit, and a first control unit. Particularly, names of these units do not constitute limitations to those units. For example, the assessment information generating unit may also be described as "a unit for generating assessment information".

In another aspect, the present disclosure further provides a computer-readable medium; the computer-readable medium may be included in the apparatus described in the embodiments; or may be separately provided, without being installed in the apparatus. The computer-readable medium carries one or more programs that, when being executed by the apparatus, cause the apparatus to: generating pedestrian assessment information based on perception information of the mobile robot, wherein the perception information includes motion information of the mobile robot, environment information of a surrounding environment, and pedestrian information of a nearby pedestrian, and the pedestrian assessment information includes a pedestrian intent type and a pedestrian event type of the nearby pedestrian; generating pedestrian behavior information based on the perception information and the pedestrian assessment information, wherein the pedestrian behavior information includes a predicted position information sequence and a predicted behavior type sequence of the nearby pedestrian in a preset future time period; generating information for control use based on the perception information, the pedestrian assessment information, and the pedestrian behavior information, wherein the information for control use includes a position information sequence and an action type sequence of the mobile robot within the preset future time period; and controlling the mobile robot based on the information for control use.

What have been described above are only preferred embodiments of the present disclosure and an illustration of the technical principle as exerted. Those skilled in the art should understand, the scope of invention in the present disclosure is not limited to the technical solution resulting from a specific combination of the technical features, and meanwhile, should also cover other technical solutions resulting from any combination of the technical features or their equivalent features without departing from the inventive concept. For example, a technical solution resulting from mutual substitution of the features and those technical features disclosed (not limited to) in the present disclosure with similar functions.

What is claimed is:

1. A method for controlling a mobile robot, comprising:
   generating pedestrian assessment information based on perception information of the mobile robot, wherein the perception information includes motion information of the mobile robot, environment information of a surrounding environment, and pedestrian information of a nearby pedestrian, and the pedestrian assessment information includes a pedestrian intent type and a pedestrian event type of the nearby pedestrian;
   generating pedestrian behavior information based on the perception information and the pedestrian assessment information, wherein the pedestrian behavior information includes a predicted position information sequence and a predicted behavior type sequence of the nearby pedestrian in a preset future time period;
   generating information for control use based on the perception information, the pedestrian assessment information, and the pedestrian behavior information, wherein the information for control use includes a position information sequence and an action type sequence of the mobile robot within the preset future time period; and
   controlling the mobile robot based on the information for control use.

2. The method according to claim 1, wherein generating information for control use based on the perception information, the pedestrian assessment information, and the pedestrian behavior information comprises:
   generating an interference type based on the perception information, the pedestrian assessment information, and the pedestrian behavior information, wherein the interference type is configured for characterizing a type of the mobile robot's interference with the nearby pedestrian; and
   generating the information for control use based on the perception information, the pedestrian assessment information, the pedestrian behavior information, and the interference type.

3. The method according to claim 2, wherein generating the information for control use based on the perception information, the pedestrian assessment information, the pedestrian behavior information and the interference type comprises:
   importing the perception information, the pedestrian assessment information, the pedestrian behavior information and the interference type into a pre-trained social aware behavior planning model to obtain the information for control use, wherein the social aware behavior planning model is configured for characterizing correspondence relationships of the motion information, the environment information, the pedestrian information, the intent type, the event type, the position information sequence, the behavior type sequence, and the interference type with the position information sequence and the action type sequence.

4. The method according to claim 3, wherein generating an interference type based on the perception information, the pedestrian assessment information, and the pedestrian behavior information comprises:
   importing the perception information, the pedestrian assessment information, and the pedestrian behavior information into a pre-trained interference assessment model to obtain the interference type, wherein the interference assessment model is configured for characterizing correspondence relationships of the motion information, the environment information, the pedestrian information, the intent type, the event type, the position information sequence, and the behavior type sequence with an interference type in a preset interference type set.

5. The method according to claim 4, wherein generating pedestrian assessment information based on the perception information of the mobile robot comprises:
   importing the perception information into a pre-trained intent assessment model to obtain the pedestrian intent type of the nearby pedestrian, wherein the intent assessment model is configured for characterizing correspondence relationships of the motion information, the environment information, and the pedestrian information with an intent type in a preset intent type set; and importing the perception information into a pre-trained event detection model to obtain the pedestrian event type of the nearby pedestrian, wherein the event detection model is configured for characterizing correspondence relationships of the motion information, the environment information, and the pedestrian information with an event type in a preset event type set.

6. The method according to claim 5, wherein generating pedestrian behavior information based on the perception information and the pedestrian assessment information comprises:

generating platform and environment prediction information based on the perception information and the pedestrian assessment information, wherein the platform and environment prediction information includes a motion information sequence of the mobile robot and an environment information sequence of the surrounding environment within the preset future time period; and generating the pedestrian behavior information based on the platform and environment prediction information, the pedestrian information in the perception information, and the pedestrian assessment information.

7. The method according to claim 6, wherein generating the platform and environment prediction information based on the perception information and the pedestrian assessment information comprises:

importing the perception information and the pedestrian assessment information into a pre-trained platform prediction model to obtain the motion information sequence of the mobile robot within the preset future time period, wherein the platform prediction model is configured for characterizing correspondence relationships of the motion information, the environment information, the pedestrian information, the intent type, and the event type with the motion information sequence; and importing the perception information and the pedestrian assessment information into a pre-trained environment prediction model to obtain the environment information sequence of the surrounding environment within the future preset time period, wherein the environment prediction model is configured for characterizing correspondence relationships of the motion information, the environment information, the pedestrian information, the intent type, and the event type with the environment information sequence.

8. The method according to claim 7, wherein generating the pedestrian behavior information based on the platform and environment prediction information, the pedestrian information in the perception information, and the pedestrian assessment information, comprises:

importing the platform and environment prediction information, the pedestrian information in the perception information, and the pedestrian assessment information into a pre-trained pedestrian behavior prediction model to obtain the predicted position information sequence and the predicted behavior type sequence of the nearby pedestrian in the preset future time period, wherein the pedestrian behavior prediction model is configured for characterizing correspondence relationships of the motion information sequence, the environment information sequence, the pedestrian information, the intent type, and the event type with the position information sequence and the behavior type sequence.

9. The method according to claim 8, further comprising:

in response to determining that at least one condition in a preset condition group is satisfied, sending wait control information to a monitoring device networked with the mobile robot, wherein the wait control information is configured for instructing the monitoring device to control the mobile robot, and the monitoring device generates a control instruction in response to receiving the wait control information, and sends the generated control instruction to the mobile robot; and in response to receiving the control instruction sent by the monitoring device, controlling the mobile robot to execute the received control instruction.

10. The method according to claim 9, wherein the preset condition group includes at least one of: a moving distance of the mobile robot within preset time period being smaller than a preset distance threshold, failing to generate the pedestrian assessment information based on the perception information, and failing to generate the information for control use based on the perception information, the pedestrian assessment information, and the pedestrian behavior information.

11. The method according to claim 10, wherein the mobile robot is a robot for delivering an item.

12. The method according to claim 11, wherein the mobile robot stores at least one of: an electronic map, and a common-sense knowledge base.

13. The method according to claim 12, wherein the motion information of the mobile robot includes at least one of: location, pose, speed, motion status, and action type of the mobile robot.

14. The method according to claim 13, wherein the environment information of the surrounding environment includes at least one of: road information of the surrounding environment, static obstacle information, and dynamic obstacle information.

15. The method according to claim 14, wherein the pedestrian information includes at least one of: pedestrian attribute information, and pedestrian behavior type.

16. An electronic device, comprising:

an interface;

a memory on which a computer program is stored; and one or more processors operably coupled to the interface and the memory, wherein the processing module functions to:

generate pedestrian assessment information based on perception information of the mobile robot, wherein the perception information includes motion information of the mobile robot, environment information of a surrounding environment, and pedestrian information of a nearby pedestrian, and the pedestrian assessment information includes a pedestrian intent type and a pedestrian event type of the nearby pedestrian;

generate pedestrian behavior information based on the perception information and the pedestrian assessment information, wherein the pedestrian behavior information includes a predicted position information sequence and a predicted behavior type sequence of the nearby pedestrian in a preset future time period;

generate information for control use based on the perception information, the pedestrian assessment information, and the pedestrian behavior information, wherein the information for control use includes a position information sequence and an action type sequence of the mobile robot within the preset future time period; and control the mobile robot based on the information for control use.

17. A non-transitory computer-readable medium on which a computer program is stored, wherein the computer program, when being executed by or more processors, cause the one or more processors to:

generate pedestrian assessment information based on perception information of the mobile robot, wherein the perception information includes motion information of the mobile robot, environment information of a surrounding environment, and pedestrian information of a nearby pedestrian, and the pedestrian assessment information includes a pedestrian intent type and a pedestrian event type of the nearby pedestrian;

generate pedestrian behavior information based on the perception information and the pedestrian assessment information, wherein the pedestrian behavior information includes a predicted position information sequence and a predicted behavior type sequence of the nearby pedestrian in a preset future time period;

generate information for control use based on the perception information, the pedestrian assessment information, and the pedestrian behavior information, wherein the information for control use includes a position information sequence and an action type sequence of the mobile robot within the preset future time period; and control the mobile robot based on the information for control use.

* * * * *